(12) United States Patent
Cohn

(10) Patent No.: US 6,275,310 B1
(45) Date of Patent: Aug. 14, 2001

(54) MODIFIED MINIMUM DISTANCE CRITERION FOR BLENDED RANDOM AND NONRANDOM ENCODING

(75) Inventor: Robert W. Cohn, Louisville, KY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/575,270

(22) Filed: May 22, 2000

(51) Int. Cl.[7] .................................................. G03H 1/08
(52) U.S. Cl. ................... 359/9; 359/29; 359/559
(58) Field of Search ................... 359/9, 29, 559, 359/566

(56) References Cited

U.S. PATENT DOCUMENTS 5,363,186 * 11/1994 Cohn et al. .......................... 356/4

\* cited by examiner

Primary Examiner—Darren Schuberg
(74) Attorney, Agent, or Firm—William G. Auton

(57) ABSTRACT

Two pixel-oriented methods for designing Fourier transform holograms, pseudorandom encoding and minimum distance encoding when combined usually produce higher fidelity reconstructions than either method produces individually. In previous studies, minimum distance encoding was defined as the mapping from the desired complex value to the closest value produced by the modulator. This method is compared with a new minimum distance criterion in which the desired complex value is mapped to the closest value that can be realized by pseudorandom encoding. Simulations and experimental measurements using quantized phase and amplitude modulators show that the modified approach to blended encoding produces more faithful reconstructions than the previous method.

4 Claims, 14 Drawing Sheets

(a)

(b)

(c)

(d)

MDE                PRE

US 6,275,310 B1

MODIFIED MINIMUM DISTANCE CRITERION FOR BLENDED RANDOM AND NONRANDOM ENCODING

STATEMENT OF GOVERNMENT INTEREST

Figure 1:
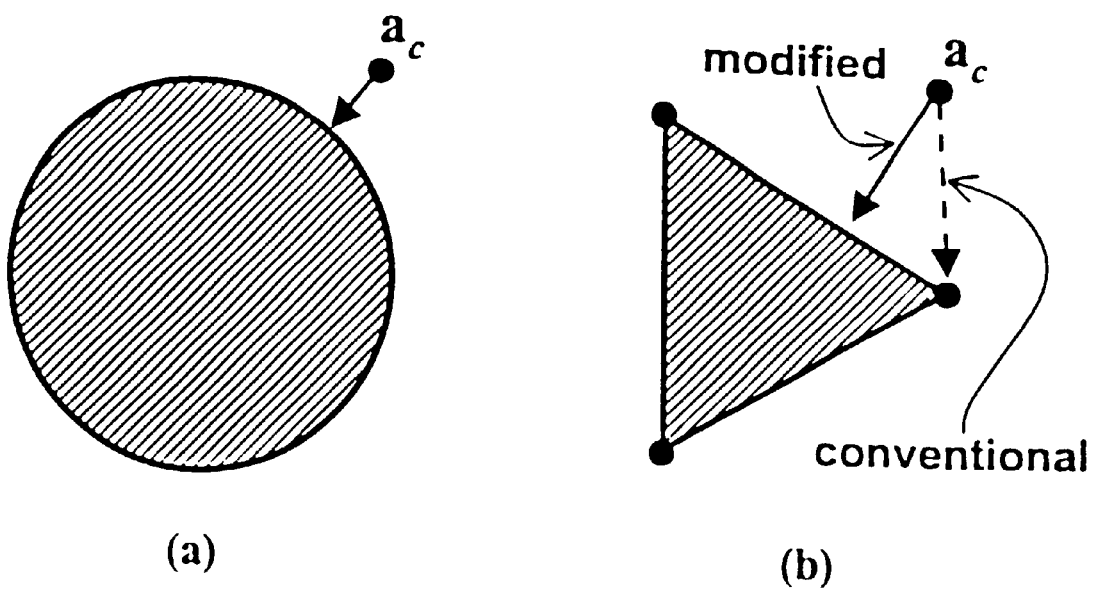

The invention described herein may be manufactured and used by or for the Government for governmental purposes without the payment of any royalty thereon.

BACKGROUND OF THE INVENTION

The present invention relates generally to Fourier transform holograms and more specifically the invention pertains to two pixel-oriented methods for designing Fourier transform holograms, pseudorandom encoding and minimum distance encoding.

Today the leading methods of designing Fourier transform holograms for laser pattern generation and optical interconnects use iterative search and numerical optimization procedures that vary the modulation values and various degrees of freedom to achieve acceptable diffraction patterns. In this prior work it is normally assumed that the design is to be realized as a fixed pattern diffractive optical element (DOE) that is subsequently mass-produced, which makes computation times of a few minutes to hours insignificant compared to the time required to fabricate the device. However, our previous studies on real-time programmable spatial light modulators and DOE rapid prototyping systems has led us to reconsider the design problem with particular emphasis on significantly reducing the design time.

By far, the fastest design algorithms are those that directly map a desired complex-valued function into a transmittance function that can be physically produced by the available modulator. The delayed-sampling method of Brown and Lohmann is one of the earliest applications in optics of this idea. The numerical speed of this and many other mapping/encoding methods that were evaluated in the first decade of computer generated holography is due to serial encoding of each desired complex value into a corresponding value of transmittance. Since the various degrees of freedom are not included in this design approach (e.g. in the design of most spot array generators where the phase of the far-field diffraction pattern is usually not of concern), the performance of the encoding method in terms of diffraction efficiency or other related metrics can be substantially less than for the optimization methods. Nonetheless, we believe there are applications that would benefit from the faster encoding algorithms.

SUMMARY OF THE INVENTION

The present invention consists of two pixel-oriented methods for designing Fourier transform holograms, pseudorandom encoding and minimum distance encoding that are combined in such a way that usually produces higher fidelity reconstructions than either method produces individually. In previous studies, minimum distance encoding was defined as the mapping from the desired complex value to the closest value produced by the modulator. This method is compared with a new minimum distance criterion in which the desired complex value is mapped to the closest value that can be realized by pseudorandom encoding. Simulations and experimental measurements using quantized phase and amplitude modulators show that the modified approach to blended encoding produces more faithful reconstructions than the previous method.

FIGURE CAPTIONS

FIG. 1. Modulation characteristics for which the minimum distance mapping to the modulation characteristic and to the encoding range (shaded regions) of the PRE algorithm are (a) identical and (b) different. In (a) the modulation characteristic is a circle and in (b) the modulation characteristic is the three dots, one at each apex of the triangle.

Figure 2:
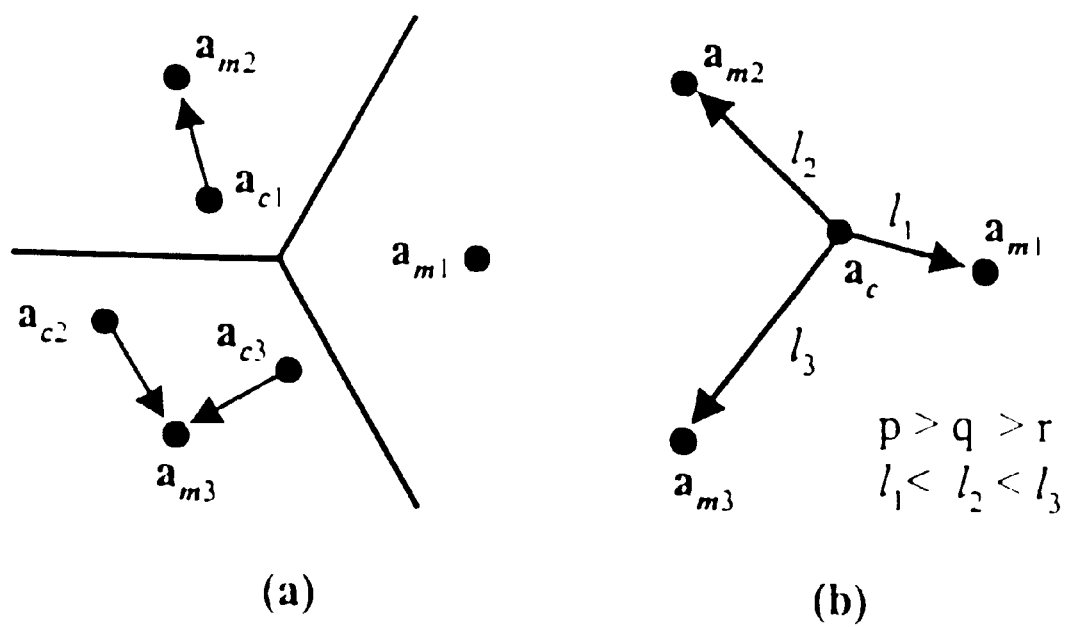

FIG. 2. Comparison of (a) the MDE algorithm to (b) the PRE algorithm for a tri-phase phase-only modulation characteristic.

Figure 3:
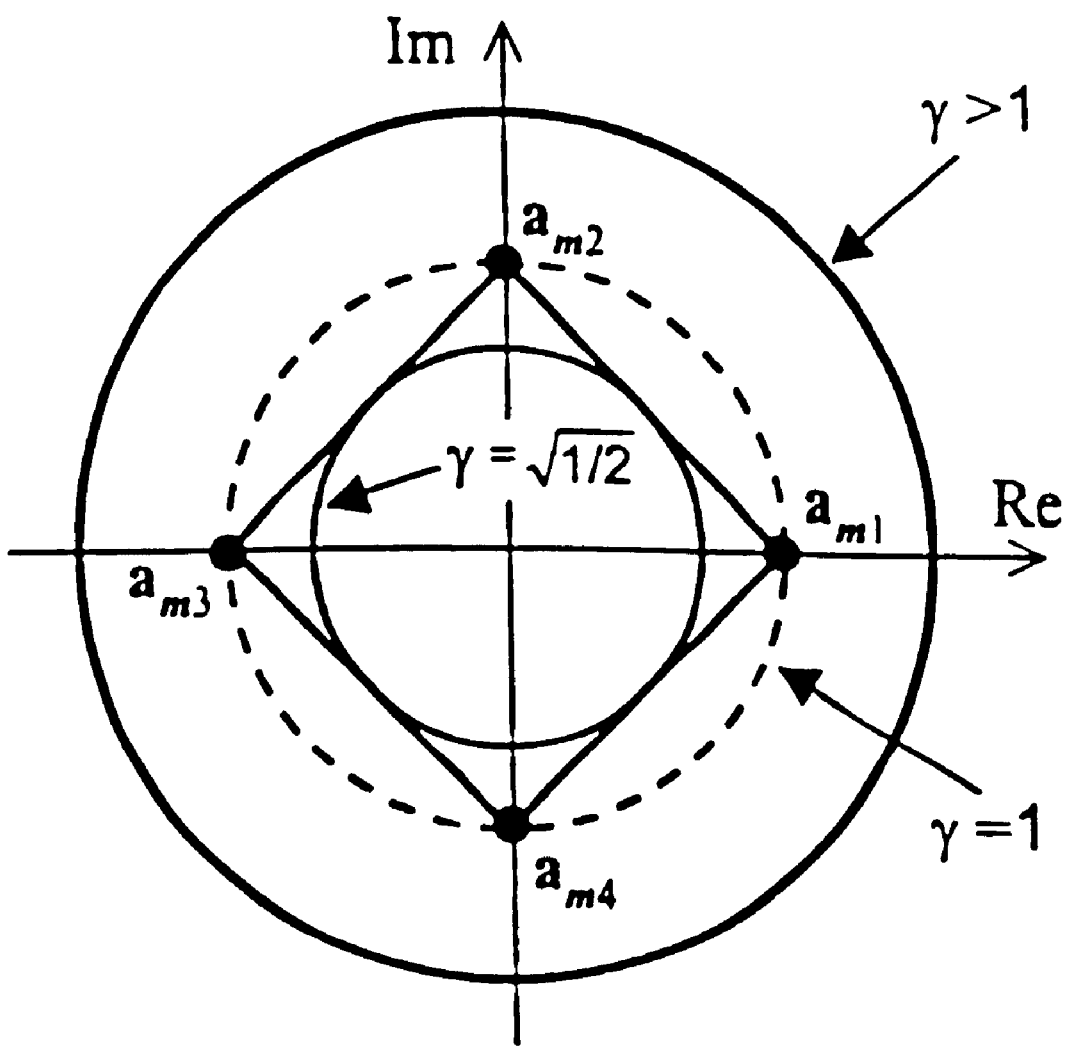

FIG. 3. Illustration of the encoding range, the fully complex encoding range and its relationship to the scaling parameter γ for a quad-phase modulation characteristic.

Figure 4:
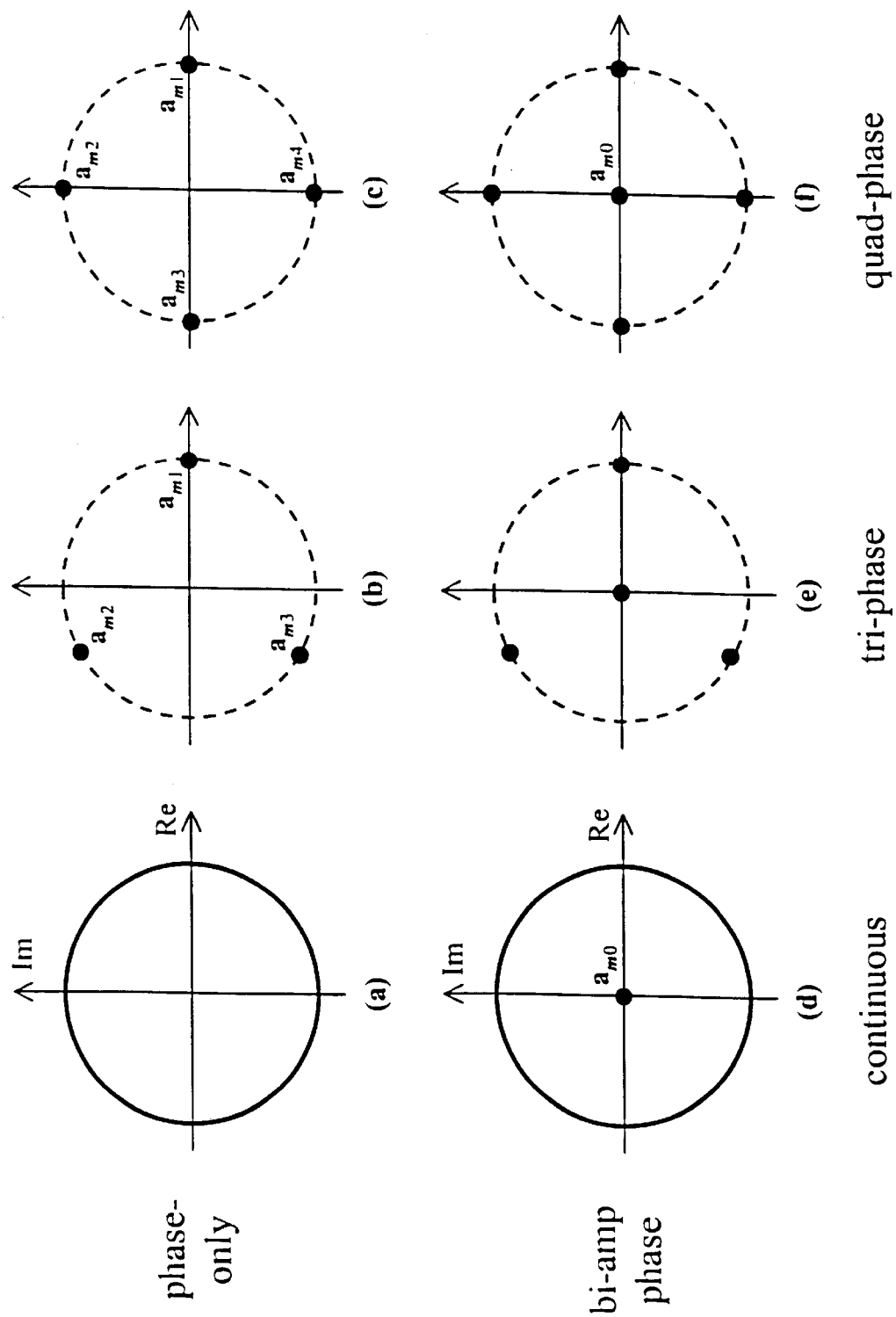

FIG. 4. Classification of the various modulation characteristics considered in this invention.

Figure 5:
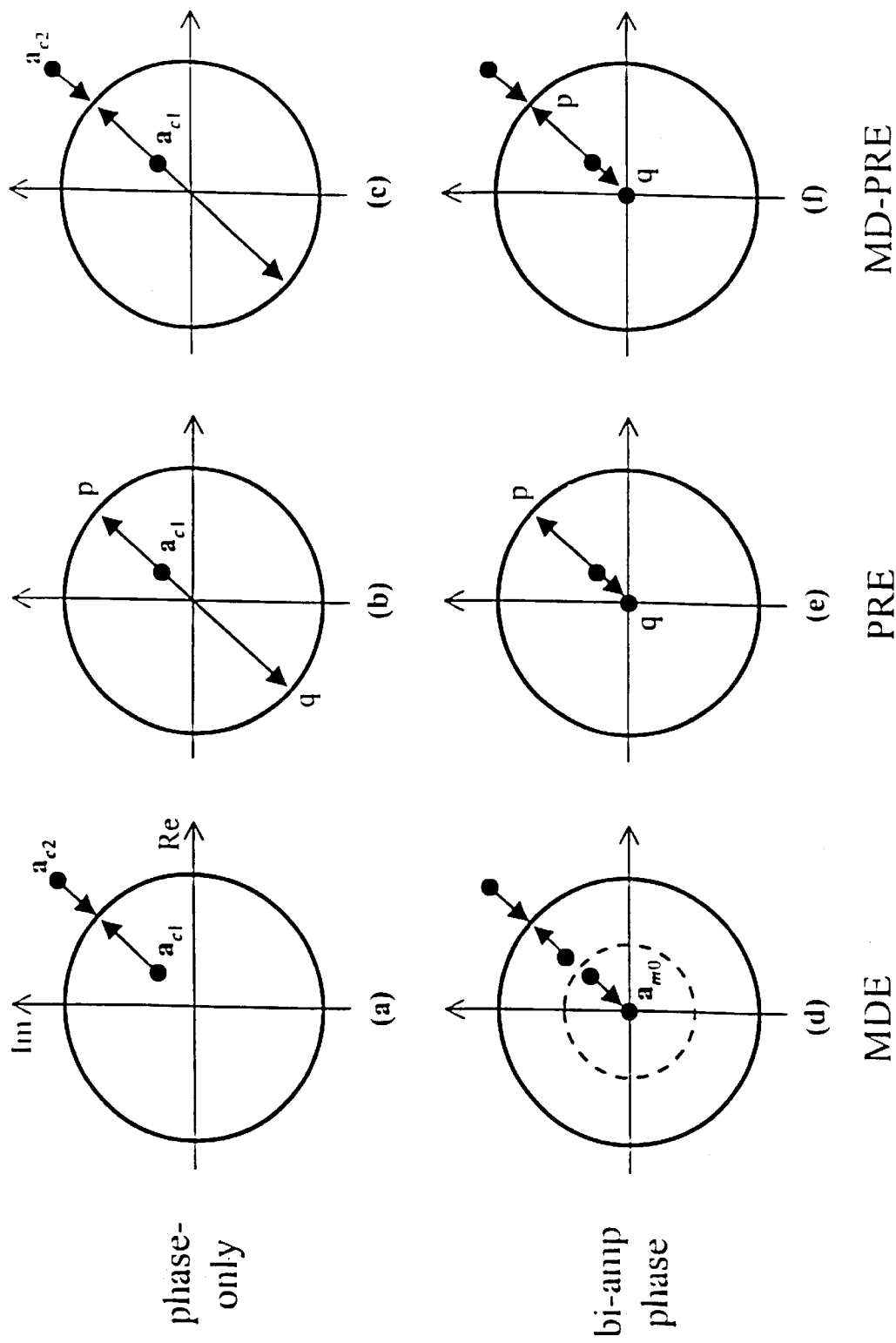

FIG. 5. Illustration of the individual MDE and PRE algorithms together with their blending for continuous modulation characteristics.

Figure 6:
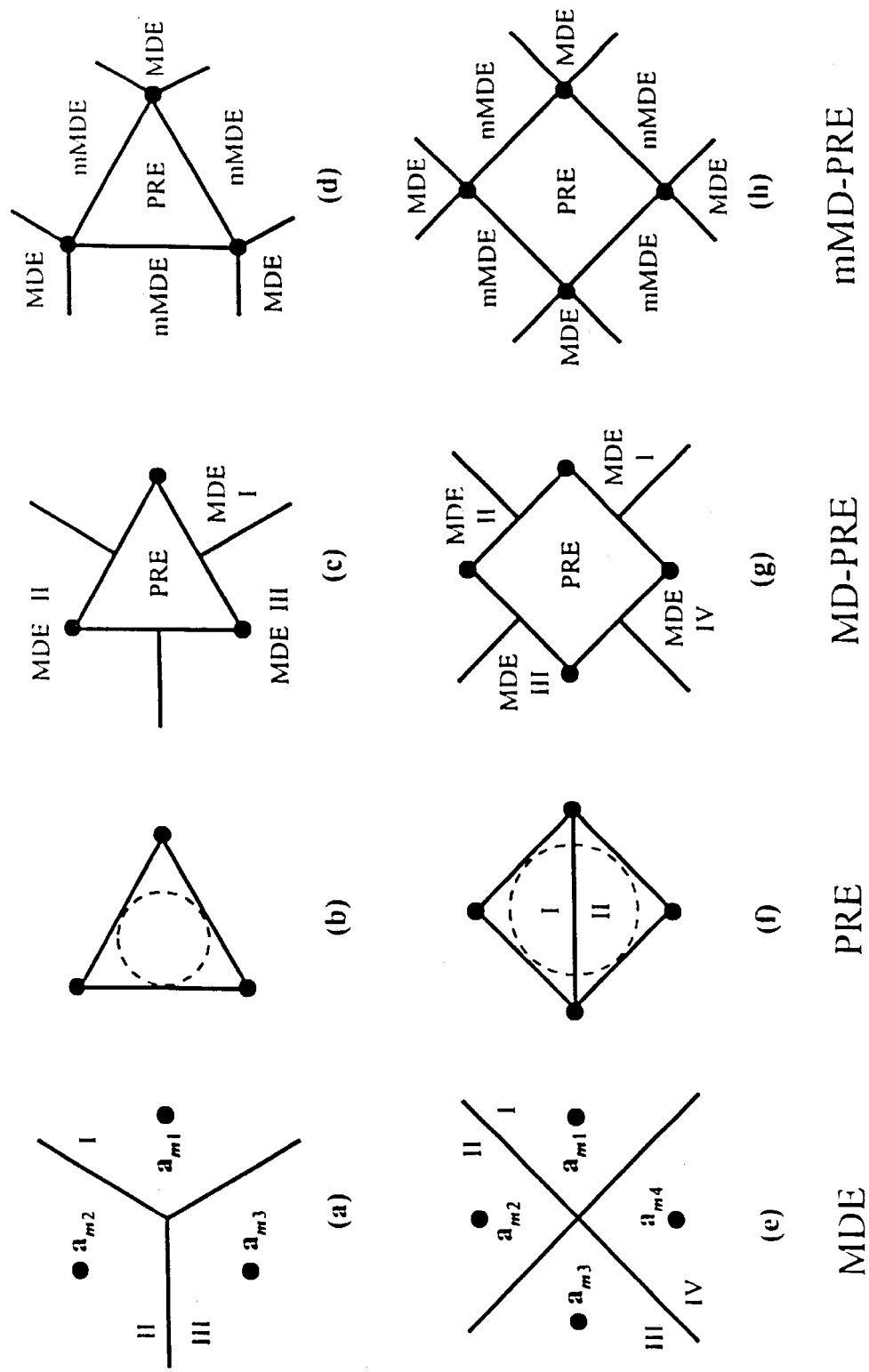

FIG. 6. Illustration of the individual MDE and PRE algorithms together with their minimum distance and modified minimum distance blendings for (a)–(d) tri-phase and (e)–(h) quad-phase phase-only modulation characteristics. (a) and (e) identify the decision regions for MDE. (b) and (f) show the encoding ranges for the PRE algorithms together with the fully complex ranges which are bounded by each dashed circle. (f) also indicates that there are two regions. Each triangular region is encoded by eqs. (7) and (8) using the three modulation values at the corners of the corresponding regions.

Figure 7:
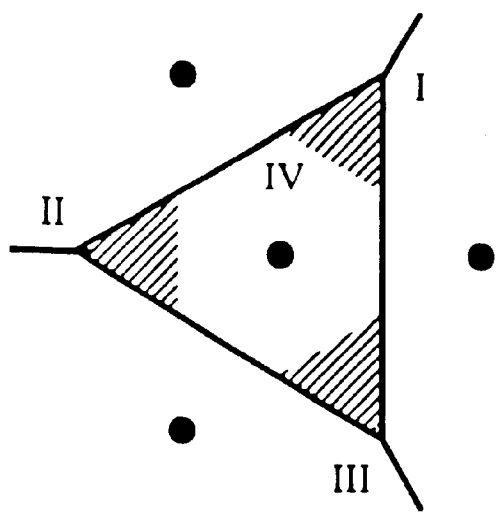
Figure 7:
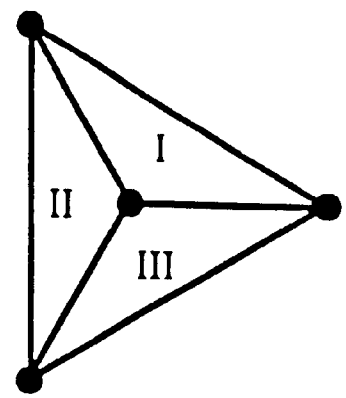
Figure 7:
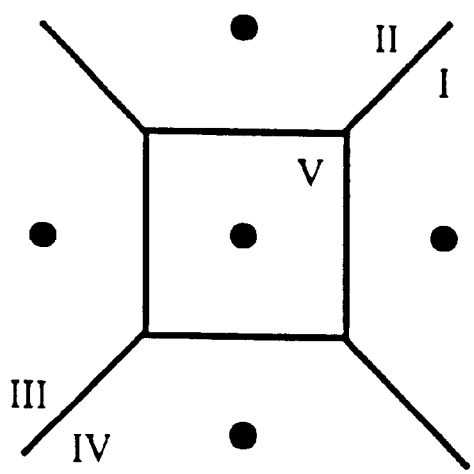
Figure 7:
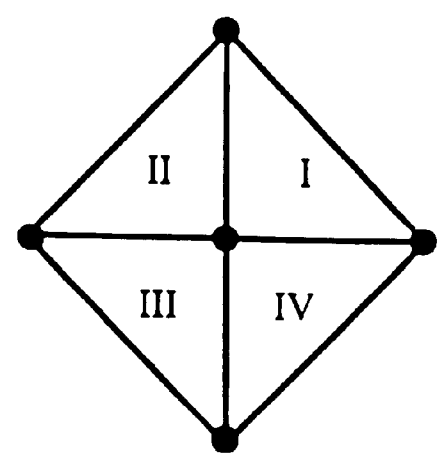

FIG. 7. Illustration of the individual MDE and PRE algorithms for bi-amplitude modulation characteristics. (a) MDE and (b) PRE for tri-phase SLMs, and (c) MDE and (d) PRE for quad-phase SLMs. (a) and (c) show the decision regions for the MDE algorithms. (b) and (d) show the individual subregions that are each encoded using ternary PRE. The shaded areas of region IV in (a) are outside the encoding range for PRE in (b). Therefore the MD-PRE blending of (a) and (b) requires that values in the shaded areas are mapped to zero according to the MDE algorithm.

Figure 8:
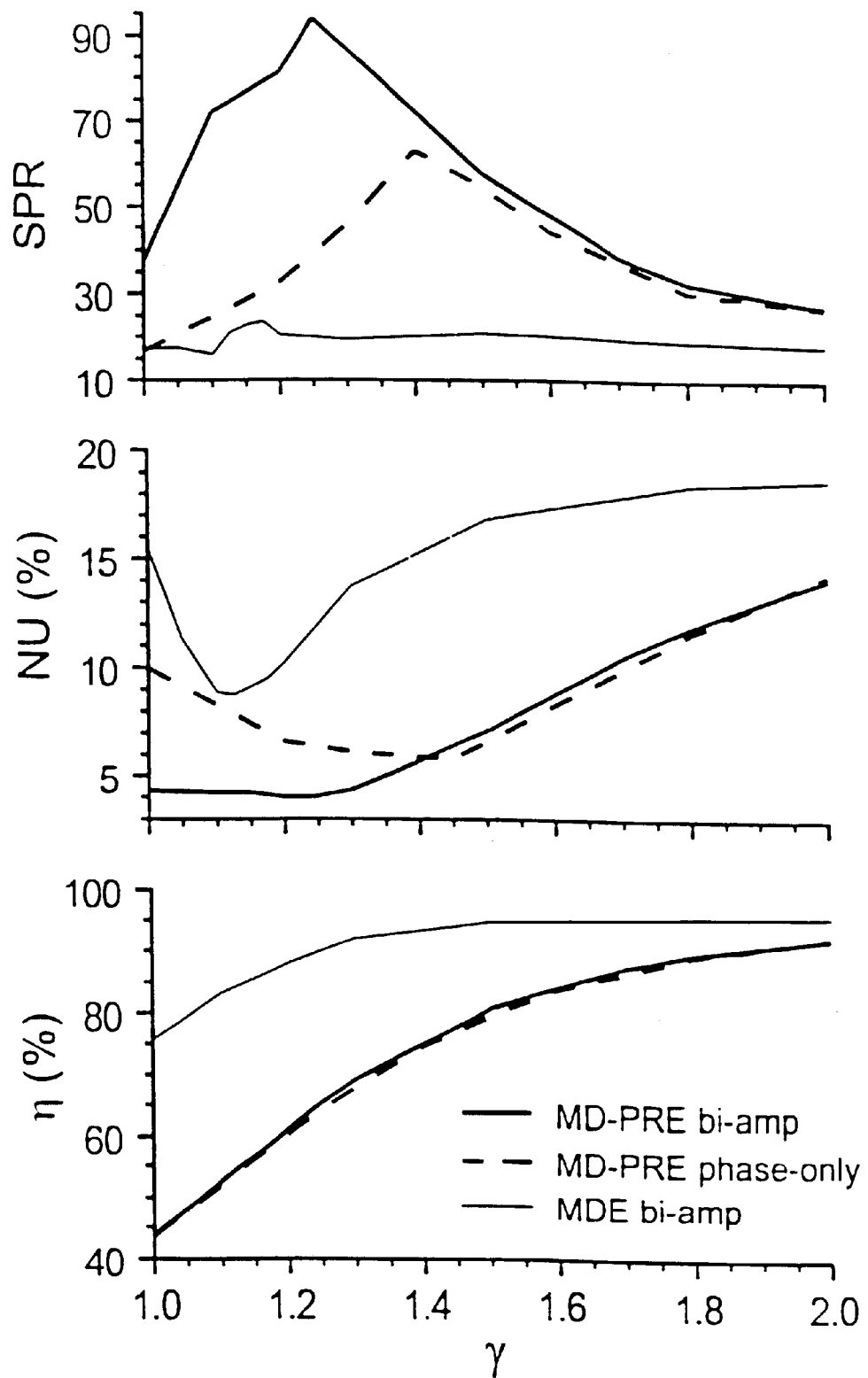

FIG. 8. Performance of blended algorithms as a function of the blending parameter for phase-only and bi-amplitude phase modulation characteristics.

Figure 9:
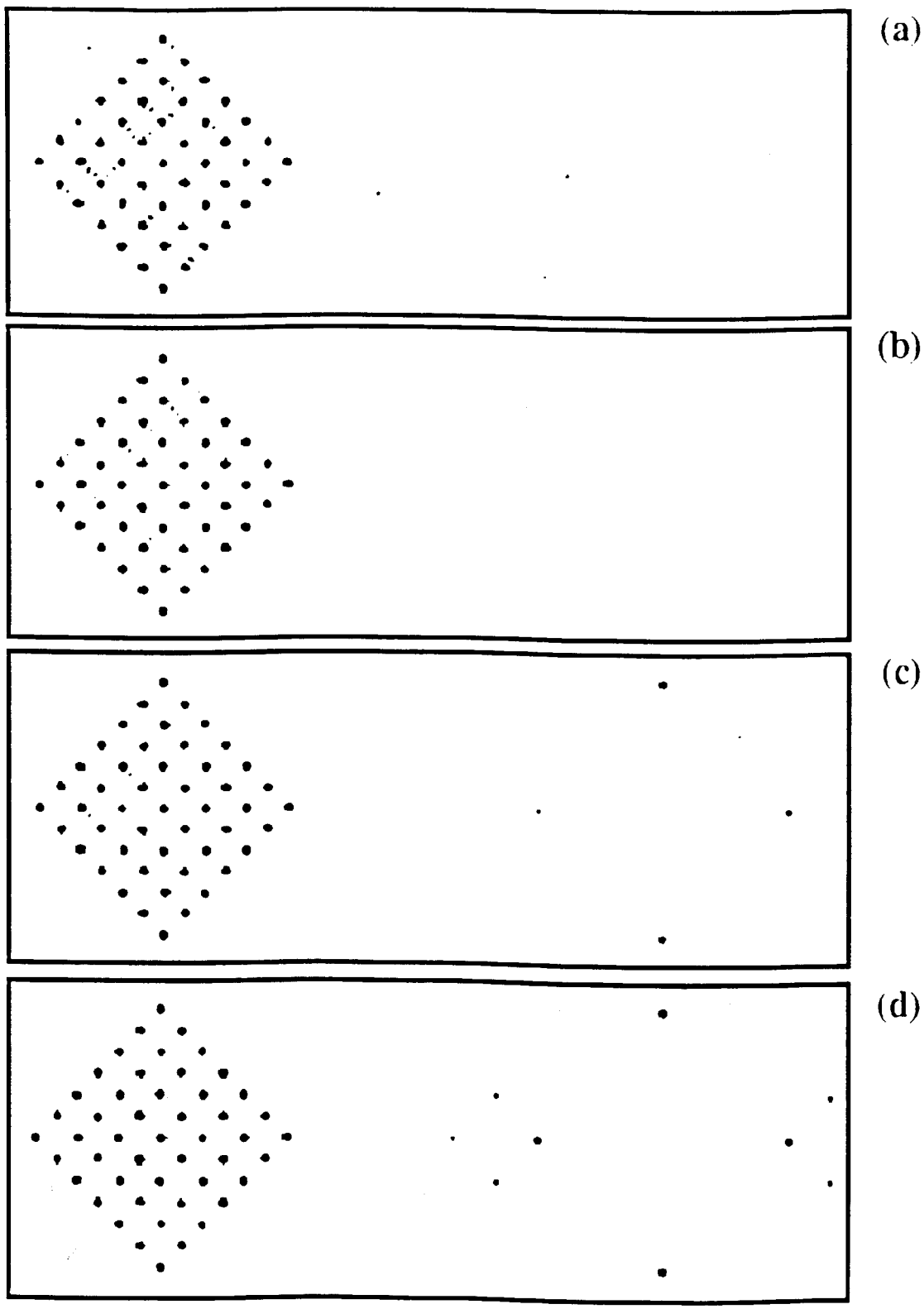

FIG. 9. Far-field intensity patterns of the tri-phase phase-only SLM for (a) PRE, (b) mMD-PRE, (c) MD-PRE and (d) MDE. The images show intensity with a photonegative linear grayscale. In order to bring out the background noise the maximum grayscale value (full black) is 30% of the average intensity of the 49 spots.

Figure 10:
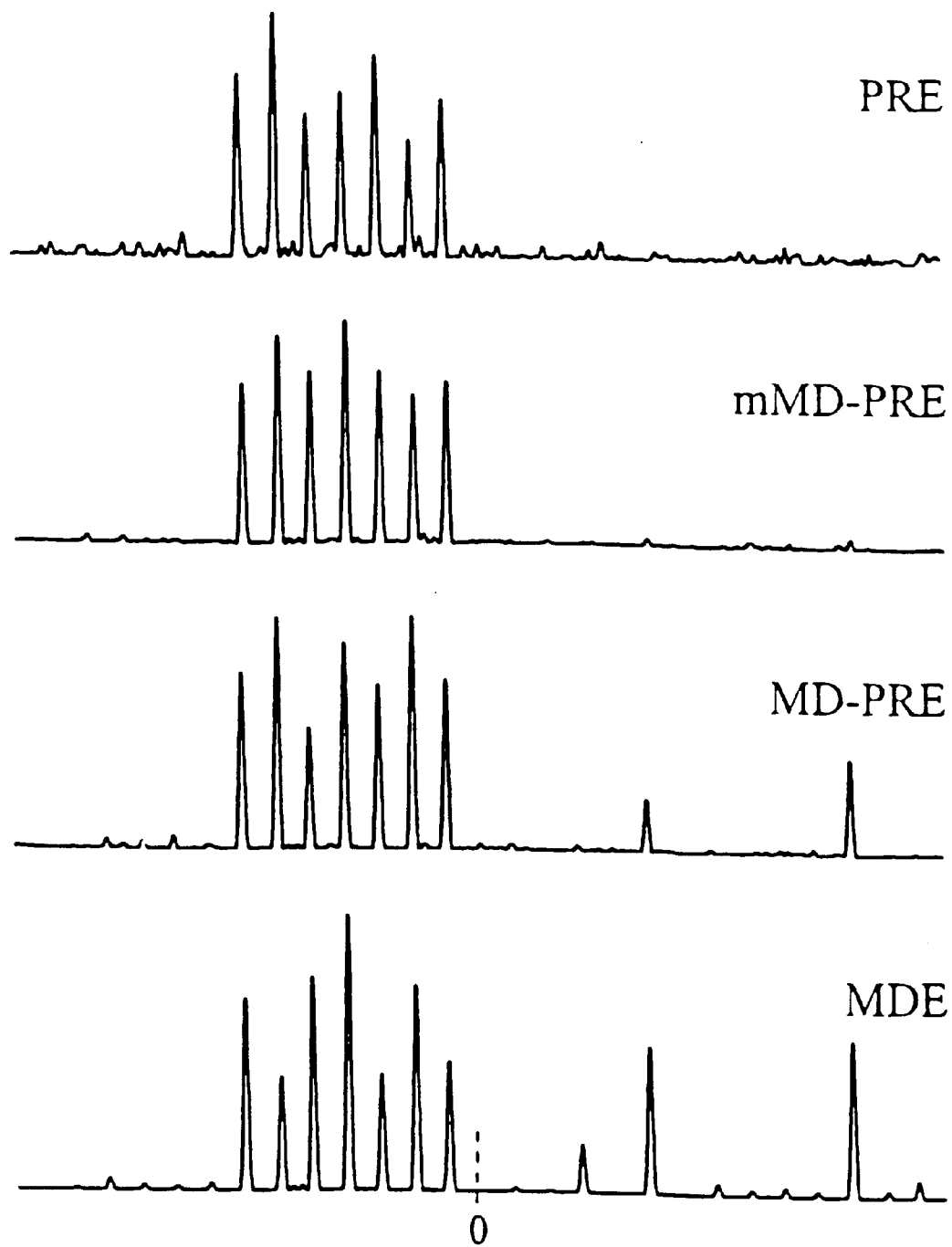

FIG. 10. Cross sections of the far-field intensity patterns of the tri-phase phase-only SLM from FIG. 9. The cross section is taken across the diagonal of the 7×7 spot array and through the optical axis (indicated by dashed vertical line.) The traces are normalized so that the average intensity of each spot array is of identical vertical length on all four plots.

Figure 11:
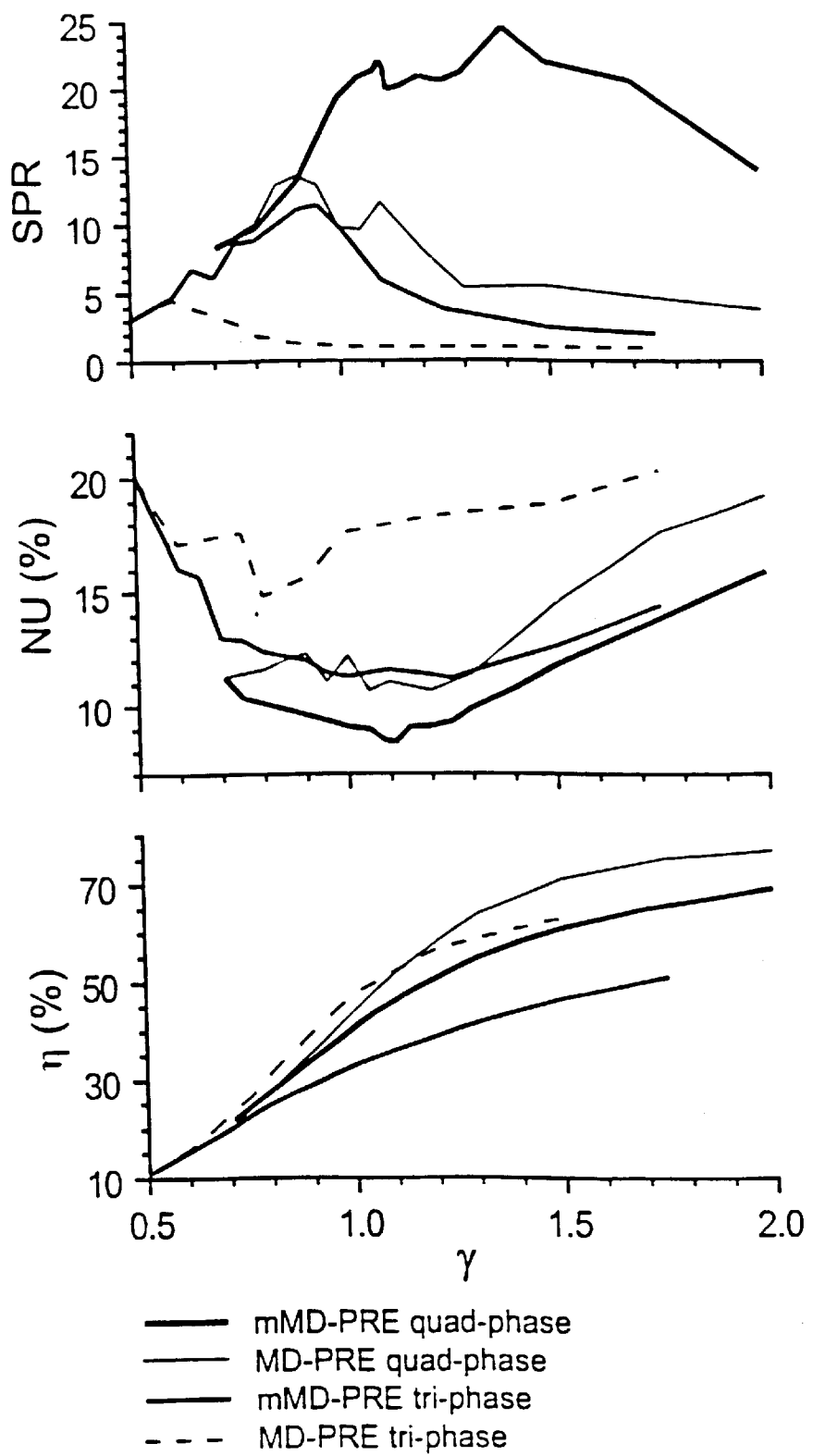

FIG. 11. Performance of blended algorithms as a function of the blending parameter for quantized-phase phase-only modulation characteristics.

Figure 12:
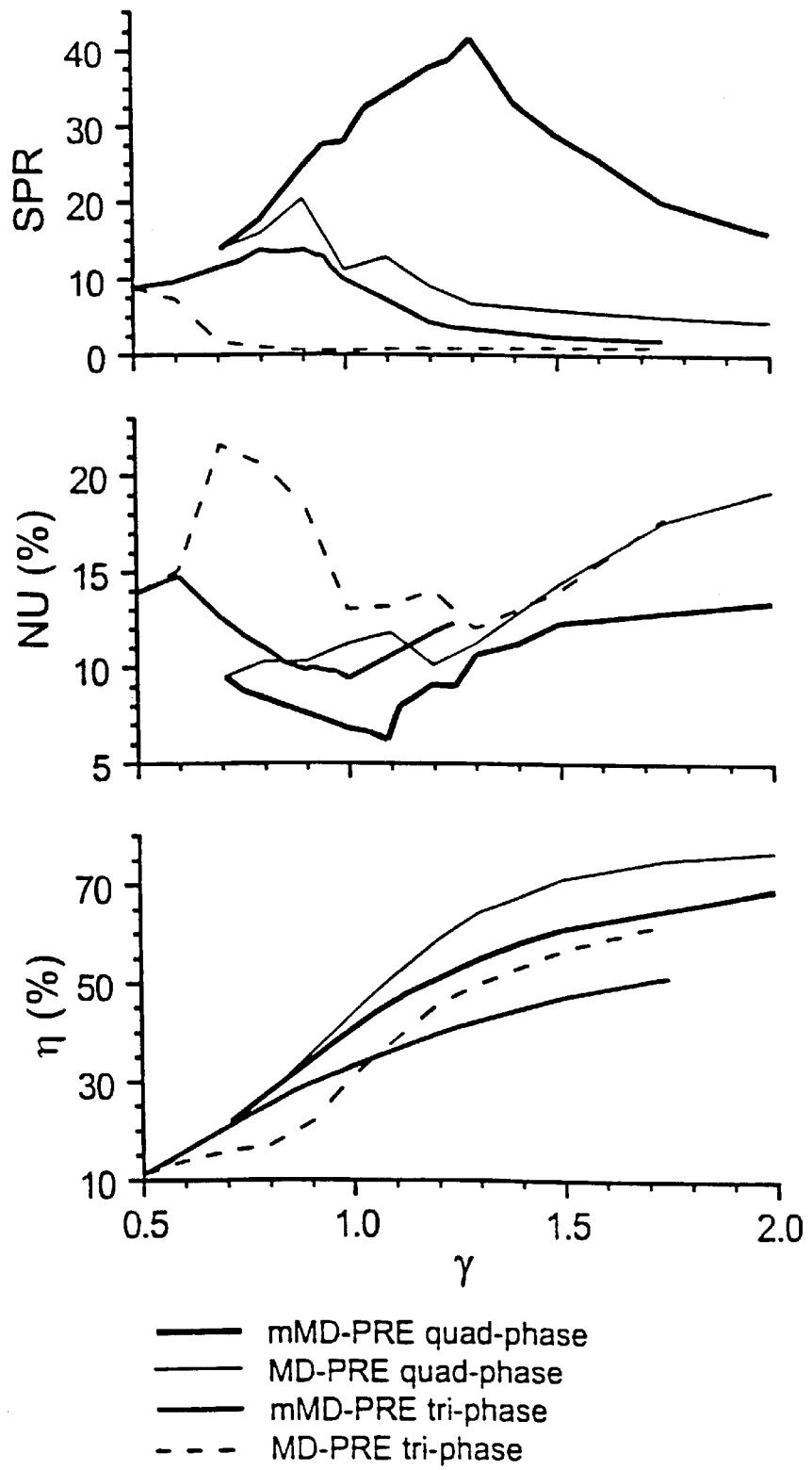

FIG. 12. Performance of blended algorithms as a function of the blending parameter for quantized-phase bi-amplitude phase modulation characteristics.

Figure 13:
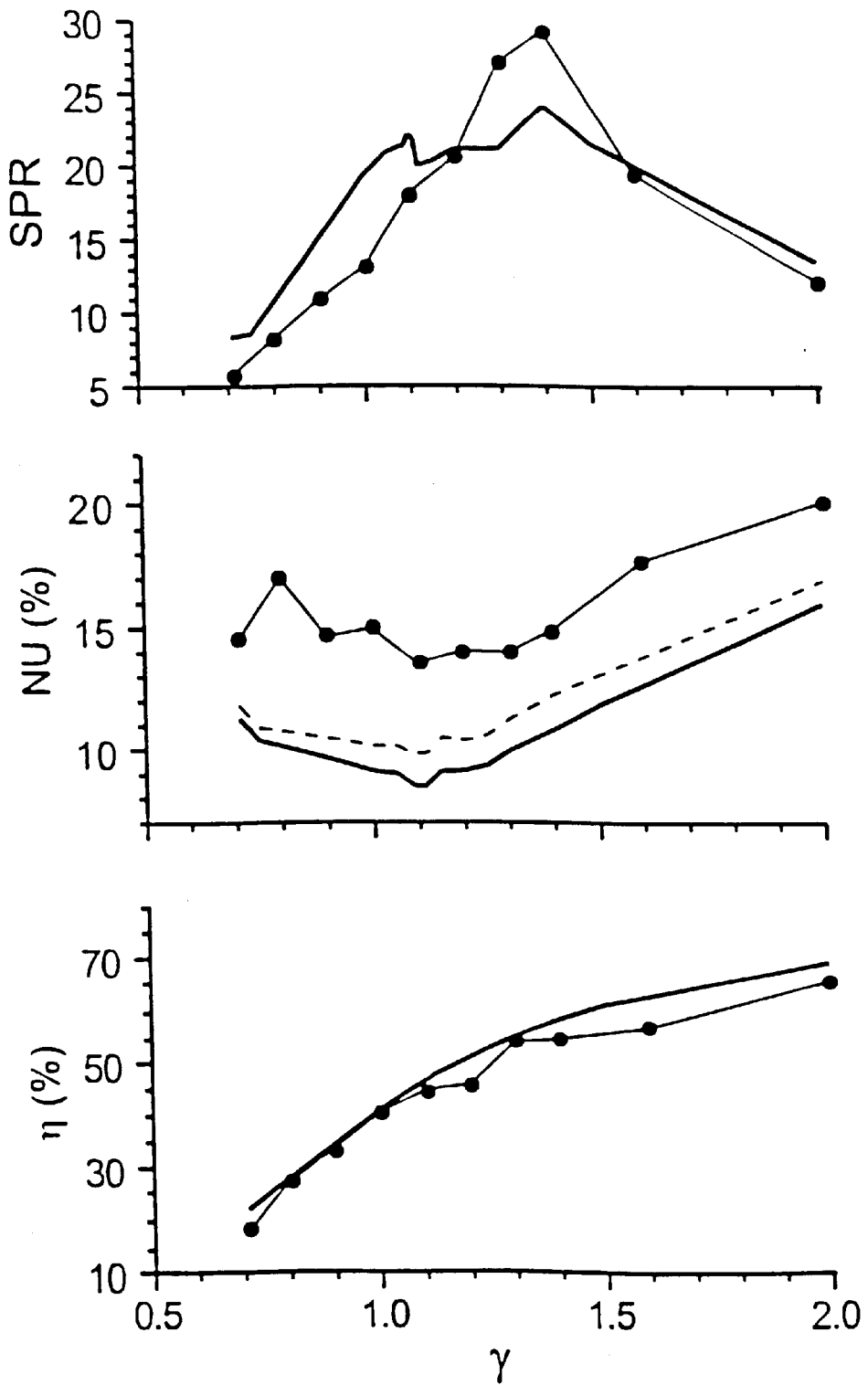

FIG. 13. Comparison between theory (thick line) and experiment (line and dots) of the performance of mMD-PRE on quad-phase phase-only SLM=s.

Figure 14:
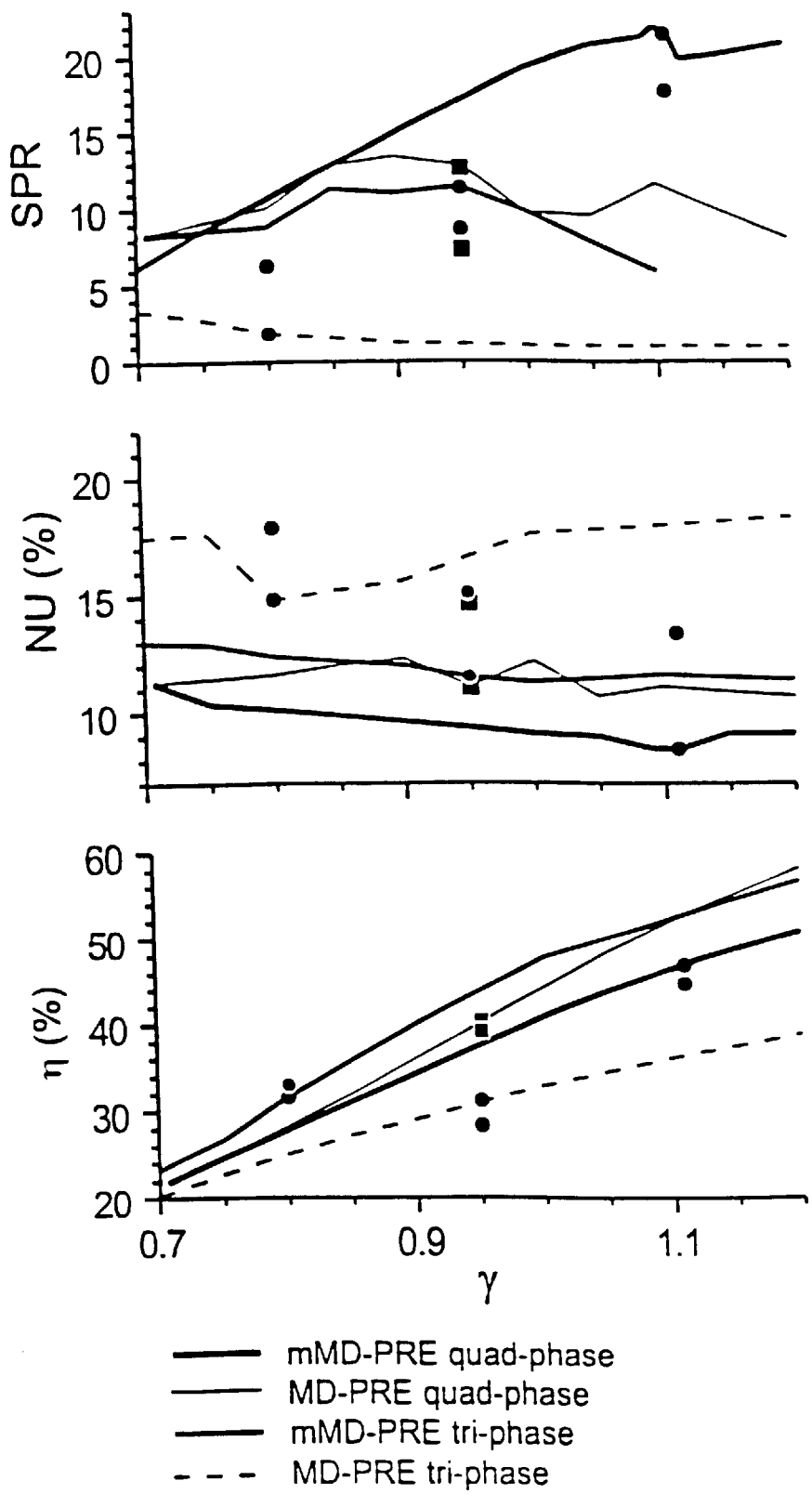

FIG. 14 shows 3 charts of the modified minimum distance criterion.

DETAILED DESCRIPTION OF THE PREFERRED EMBODIMENT

The present invention combines two pixel-oriented methods for designing Fourier transform holograms, pseudorandom encoding and minimum distance encoding into a single improved performance method.

In order to reduce the differences in performance between optimal designs and encoded designs we have begun investigating suboptimal design strategies in which some additional computations (but less than those required to find the global optimum) are directed at improving device performance. Two possible suboptimal strategies are (1) use the best solution found by optimization for a given amount of time, or (2) optimize using some, rather than all, of the available design freedoms. It is this second approach that we consider here.

Specifically, we consider encoding methods that can be improved by varying a single design freedom/free parameter. The free parameter (referred to as $\gamma$) scales the magnitude of the complex-valued function that is to be encoded. Each value of the complex function is encoded by one of two encoding algorithms: pseudorandom encoding (PRE) for smaller magnitude values and for larger values minimum distance encoding (MDE), both of which will be reviewed. Increasing the value of the free parameter decreases the number of complex values that are encoded by the PRE algorithm and increases the number of values encoded by the MDE algorithm. In this way the free parameter controls the blending of the two encoding algorithms.

In each specific design considered it was found that better performance is achieved over PRE or MDE individually by blending the two algorithms, and that there is a particular degree of blending (as measured by $\gamma$) that gives the best performance of all blendings. At times we have noted dramatic improvements in performance even if only a few percent of the complex values are encoded by MDE. However, we recently observed for modulators that produce only three quantized values of phase that the blending of MDE and PRE leads to only slight performance improvements, and for some blendings the performance is even lower than without blending.

This observation leads us in this invention to propose, consider and evaluate a modified blending of encoding algorithms. FIG. 1a shows the phase-only SLM characteristic that was considered. Desired complex values that are inside the phase-only modulation characteristic (shaded region) can be pseudorandom encoded. The values outside the region are mapped to the closest point on the modulation characteristic (along radial lines centered on the origin.)

There is an alternate possible mapping that becomes apparent when considering blended encoding with non-circular SLM characteristics. This is illustrated in FIG. 1b for a three phase SLM. The shaded region again represents the range of values that can be encoded by the PRE algorithm. There are now two possible minimum distance mappings. The conventional MDE algorithm maps the desired value to the closest value produced by the SLM. Alternately, we propose the modified MDE (mMDE) in which the desired value is first mapped to the closest value that can be pseudorandom encoded, and then the mapped value it is encoded to a modulation value by PRE.

In this invention we will show, using both computer simulations and experiments with a phase-only SLM, that the proposed modified blended encoding algorithm generally outperforms the earlier blended algorithm in terms of two metrics that describe fidelity of the reconstruction (the ratio of intensity of the desired portions of the diffraction pattern to peak background noise, and the relative error in intensity between the desired and actual diffraction patterns.) This demonstration is the primary objective of this invention. One secondary objective is to suggest how blended encoding algorithms can be developed for a variety of SLM modulation characteristics. Our approach is to develop blended algorithms for several different modulation characteristics. Another secondary objective is to provide a comprehensive comparison of the performance of various encoding algorithms developed to date. This is achieved by encoding an identical desired function for each algorithm and for each value of the scaling parameter $\gamma$.

The next section reviews the development of the proposed encoding algorithm and presents general background that is used to develop the new algorithms. The following section defines the modulation characteristics and the algorithms used in the study. The next to final section reports the results of the simulation study and the final section presents the experimental results.

Background on and Review of Encoding

A. Review of Pixel-oriented Encoding Algorithms

The design methods considered in this invention can be classified as pixel-oriented encoding since each pixel represents a desired complex value independent of the values represented by all other pixels in the SLM. Pixel-oriented encoding is a special case of point-oriented encoding. In traditional point-oriented encoding methods, the desired complex valued function is modulated onto a carrier of spatial frequency that exceeds the space bandwidth product of the desired complex function. Therefore these methods require SLMs with space-bandwidth products (SBWP) that exceed the SBWP of the desired signal. However, in pixel-oriented encoding the SBWP of the signal can be as large as that of the SLM as a result of the one-for-one mapping between each desired complex value and the modulation value of each corresponding pixel. Thus, pixel-oriented encoding has an advantage over traditional point-oriented encoding, and also group-oriented encoding methods, when the SLM has a small number of pixels, as is the case for most of the electrically-addressable SLMs that are available today.

There appear to be two approaches to pixel-oriented encoding. One approach is to map each desired complex value to the closest available modulation value produced by its corresponding pixel. For continuous value, phase-only SLMs this prescription leads to a unique mapping in which the amplitude of each value is set to unity and the mapped phase is identical to the desired phase. That is, MDE for the continuous phase-only SLM reduces to the well known kinoform or phase-only filter.

The second encoding approach PRE, rather than selecting the closest available modulation value, selects one modulation value from a range of possible values by using a computer-generated random (i.e. pseudorandom) number. The statistical properties of the random number generator are designed so that the average modulation value is identical to the desired complex value. The diffraction pattern produced by this transmittance function has an average intensity that is identical to the desired diffraction pattern plus a noise background. The diffraction efficiency $\eta$ of the pseudorandom encoded function is identical to that of the desired fully complex function. The remaining energy $1-\eta$ is either scattered into the noise background for phase-only SLMs, or scattered into noise and absorbed if the SLM is non-phase-only.

PRE differs from MDE in that MDE always maps the desired value to the closest available value on the modulation characteristic while PRE maps the desired value to closer modulation values with greater relative frequency than to modulation values that are farther away. For quantized modulation characteristics the encoding algorithms are analogous to the numerical rounding of floating point numbers. MDE is analogous to nearest integer rounding while PRE corresponds to rounding to the nearest integer most frequently and to the furthest integer least frequently according to a random selection process. MDE and PRE are illustrated in FIG. 2 for tri-phase modulation (with modulation values $a_{m1}$, $a_{m2}$, $a_{m3}$.) For MDE (FIG. 2a), mapping to the closest value of modulation divides the complex plane into three decision regions separated by the three lines. For PRE (FIG. 2b), the modulation values $a_{m1}$, $a_{m2}$, and $a_{m3}$ are randomly selected with the relative frequencies/probabilities p, q and r (which are inversely proportional to $l_1$, $l_2$ and $l_3$, the distances between the desired value $a_c$ and the modulator values.) The complete mathematical specification of these PRE and MDE algorithms for tri-phase modulation, and various other modulation characteristics is given in a later section. The PRE algorithms for quantized modulation originally were derived and compared with MDE algorithms for quantized modulation.

B. Review of Reduced-parameter Suboptimal Design Methods

The earliest applications of design optimization using a few parameters appears in the work of Farn and Goodman, and Juday on the design of single object correlation filters for limited modulation range SLMs. A fully complex filter is specified that optimizes a given performance metric. The filter has the complex-valued free parameter $\Gamma = \gamma \exp(j\beta)$ which scales the amplitude of the desired function by $\gamma$ and rotates the phase by $\beta$. The desired function is encoded by the MDE algorithm for different values of $\gamma$ and $\beta$. The optimum values $\gamma^*$ and $\beta^*$ minimize the sum of squares error between the desired function and encoded values. There are no other free parameters for the single object matched filter and thus the design is optimal. However more recent studies have reported suboptimal searches over these two parameters for the design of composite pattern recognition filters and spot array generators. These studies predated and stimulated the development of the first algorithms that blend MDE and PRE to various degrees as a function of the free parameter $\gamma$.

In specific cases searches over one or both of the free parameters can be avoided. For specific modulation characteristics the encoding algorithm can be independent of $\gamma$ and/or $\beta$. For instance in FIG. 2a, the sum of squares error for MDE is independent of $\gamma$ but dependent on $\beta$. As stated previously, for continuous value phase-only SLMs the MDE algorithm reduces to the classical kinoform, and thus no search is required at all. Also, the distribution of the desired values over the complex plane can make the optimization insensitive to the variation in $\gamma$ or $\beta$. For instance in FIG. 2, if the desired complex values are uniformly distributed in magnitude and phase then there is essentially no dependence on the value of $\beta$. This observation is used in the present study to perform single parameter searches over $\gamma$ both for MDE and blended encoding.

C. PRE Encoding Range and the Fully Complex Encoding Range

Another reason for the development of blended algorithms is that while MDE algorithms can encode complex values of any magnitude, the PRE algorithm cannot. This is because in PRE the desired value is encoded so that its complex value is equivalent to an average of the available modulation values and the average is thus constrained to lie between the modulation values. A procedure for evaluating the range over the complex plane that can be encoded by a given PRE algorithm is developed in the literature. Ranges for the modulation characteristics considered in this invention are shown in FIGS. 1 and 3. For continuous phase-only modulation (FIG. 1a) the PRE range is the interior of the unit circle. FIG. 1b shows the range for three-value quantized phase modulation. The encoding for the PRE algorithm is the triangular region that is enclosed by the line segments connecting the three values of modulation. Similarly for a four-value quantized phase modulation (FIG. 3) the encoding range is the square and its interior, which is defined by the line segments connecting the modulation values.

Note in FIG. 3 that the desired complex function can be normalized so that its values are contained within a circle of radius $\gamma = \frac{1}{2}$. We refer to this as the fully complex encoding range for the quantized PRE algorithm.*(see footnote) Also note for phase-only modulation that the encoding range and the fully complex range are identical (the region enclosed by $\gamma = 1$ in FIG. 3) and that they enclose a larger area of the complex plane than does the quantized PRE algorithm. In this invention the encoding range is increased by blending PRE algorithms with algorithms that do not have limited encoding ranges. As is shown in later sections, the diffraction efficiency is increased and the fidelity is optimized for fully complex encoding ranges (as designated by the scaling parameter $\gamma$) that exceed the encoding range of PRE alone.

*Footnote: For individual functions for which the distribution of complex values is non-circular the fully complex range can approach $\gamma = 1$. However, we do not apply this definition to individual functions, but rather to the set of all functions of interest.

Design of the Study

A. Modulation Characteristics

The modulation characteristics considered in this study are illustrated in FIG. 4. Three of the characteristics (a)–(c) are phase-only (a) continuous, (b) three phases uniformly spaced around the unit circle and (c) four uniformly spaced phases. By adding an additional zero value to each characteristic gives the bi-amplitude modulation characteristics (d)–(f). We will refer to these modulation characteristics using the descriptive terms tri-phase and quad-phase. Also, we use the terms bi-amplitude phase and phase-only to distinguish between modulation characteristics that have or do not have a zero value.

B. The Encoding Algorithms

The implementation and theory of PRE and MDE has been presented in the publications reviewed in prior sections. We only present the details necessary to permit others to understand and to reproduce the results presented in later sections. As an aid to the reader, each of the specific algorithms studied is presented in the figures. We begin with the less involved algorithms for the continuous modulation characteristics (FIG. 4a,d) and proceed through increasingly involved algorithms for tri-phase (FIG. 4b,e) and quad-phase (FIG. 4c,f) characteristics.

C. Encoding Algorithms for Continuous SLMs

FIG. 5a illustrates MDE for a phase-only SLM. As mentioned before, because of circular symmetry of the modulation characteristic the desired fully complex function (illustrated by the values $a_{c1}$ and $a_{c2}$ in in FIG. 5a) can be scaled by an arbitrary complex number $\Gamma$ and the encoding still maps to the unit circle identically. However, with the addition of a zero value of modulation MDE for the bi-amplitude phase modulator the mapping becomes more involved in two respects: (1) While the mapping still is along radial lines there is now a threshold level (dashed line in FIG. 5d.) Values less than radius $\frac{1}{2}$ are closer to the origin than to unity and therefore map to the origin. (2) Because of the threshold the mapping now depends on the magnitude of the scaling parameter $\gamma$. For $\gamma=0$ all the desired complex values map to $a_0$ and, for $\gamma=\infty$ the complex values map to the unit circle, which is identical to the mapping in FIG. 5a.

Our convention for reporting the value of the scaling parameter $\gamma$ (for all encoding algorithms presented) is as follows: The desired complex function consists of N samples $a_{ci}$ at positions indexed by i from 1 to N. The complex values are normalized so that the maximum value of $|a_{ci}|$ from the N samples is identical to $\gamma$. The value of $\gamma$ that produces the best performance according to a given metric or cost function is usually written as $\gamma^*$.

FIG. 5b illustrates PRE for phase-only SLMs. This particular algorithm was introduced in the literature. The desired value $a_{c1}$ is mapped to one of two modulation values that are 180° apart. For each pixel transmittance $a_{ci}$, the probability of selecting the modulation value that is closer to the desired value is $$p_i=(1+|a_{ci}|)/2$$

and the probability of selecting the alternate value is $q_i=1-p_i$. Using these values of probability the encoding formula is $$a_i=\exp[j\arg(a_{ci})] \text{ if } 0 \leq s_i < p_i$$

$$a_i=-\exp[j\arg(a_{ci})] \text{ if } p_i \leq s_i \leq 1$$

where $a_i$ is the actual modulation selected for the i th modulator pixel and $s_i$ is a computer generated random number uniformly distributed between 0 and 1. To reduce encoding errors the value of $\gamma$ usually is made as large as possible. For phase-only SLMs this corresponds to $\gamma=1$. For values of $\gamma>1$ the complex values that exceed unity cannot be pseudorandom encoded. These values can be encoded by MDE which leads to the blended minimum distance and pseudorandom encoding algorithm (MD-PRE) illustrated in FIG. 5c.

The PRE algorithm for bi-amplitude phase modulation is illustrated in FIG. 5e. The probability is $p_i=|a_{ci}|$ and $q_i=1-p_i$. The encoding formula is $$a_i=\exp[j\arg(a_{ci})] \text{ if } 0 \leq s_i < p_i$$

$$a_i=0 \text{ if } p_i \leq s_i \leq 1$$

The MD-PRE algorithm for bi-amplitude phase modulation (FIG. 5f) uses the PRE algorithm for encoding values inside the unit circle and phase-only MDE for encoding values outside the unit circle.

D. Ternary Pseudorandom Encoding

The encoding formula for ternary-valued modulation is presented here in general form because it is the basis for the PRE algorithms for all the quantized SLMs considered in this study (FIG. 4b,c,e,f). The ternary PRE algorithm can be specified for any three modulation values $a_{m1}$, $a_{m2}$, $a_{m3}$ as long as they do not lie on a common line. The encoding formula is $$a_i=a_{m1} \text{ if } 0 \leq s_i < p_i$$

$$a_i=a_{m2} \text{ if } p_i \leq s_i < 1-r_i$$

$$a_i=a_{m3} \text{ if } 1-r_i \leq s_i \leq 1$$

where $p_i$ is the probability of selecting $a_{m1}$, $q_i$ is the probability of selecting $am_2$, and $r_i$ is the probability of selecting $a_{m3}$. As in the prior subsection, $s_i$ is a random number drawn from the uniform probability distribution. The three probabilities are found by solving $$\begin{bmatrix} \text{re}(a_{ci}) \\ \text{im}(a_{ci}) \\ 1 \end{bmatrix} = \begin{bmatrix} \text{re}(a_{m1}) & \text{re}(a_{m2}) & \text{re}(a_{m3}) \\ \text{im}(a_{m1}) & \text{im}(a_{m2}) & \text{im}(a_{m3}) \\ 1 & 1 & 1 \end{bmatrix} \begin{bmatrix} p_i \\ q_i \\ r_i \end{bmatrix}$$

where $a_{ci}$ is the desired complex value that is encoded. For quantized SLMs that have more than three modulation values, the PRE algorithm is developed by using eqs. (5) and (6) with various groups of three modulation values to encode various regions of the complex plane.

E. Encoding Algorithms for Quantized Phase-only SLMs

FIG. 6 illustrates how the individual MDE and PRE algorithms are combined into the MD-PRE and the modified MD-PRE (mMD-PRE) algorithms both for tri-phase and quad-phase modulation characteristics.

For MDE on tri-phase SLMs the complex plane is divided into three decision regions (FIG. 6a) and desired values in a particular region are mapped to the modulation value in that region. For PRE on tri-phase SLMs (FIG. 6b) the modulation values used in eqs. (5) and (6) are $a_{m1}=1$, $a_{m2}=\exp(j2\pi/3)$ and $a_{m3}=\exp(-j2\pi/3)$. Values in the interior of the triangle in FIG. 6b can be pseudorandom encoded and the inscribed circle (dashed curve), which is of radius $\gamma=0.5$, represents the fully complex range for this PRE algorithm. The MD-PRE blended algorithm uses PRE for desired values on and inside the triangle of FIG. 6b, and it uses the MDE decision regions of FIG. 6a for values outside the triangle. The PRE and MDE regions for the blended algorithms are labeled in FIG. 6c.

As in FIG. 1b, MD-PRE can be modified to the mMD-PRE algorithm by mapping desired values that are outside the PRE range to the closest values on the boundary of the PRE range. Then the mapped value is encoded by the PRE algorithm. We will refer to the mapping of values by this prescription as modified MDE (mMDE). The mMDE regions are identified in FIG. 6d. The regions identified as MDE in FIG. 6d also are encoded by the mMDE prescription; however, the mMDE for these regions is identical to MDE.

The mMD-PRE for the quad-phase SLM is developed in a similar manner as described for tri-phase encoding. FIG. 6e–h illustrates the corresponding succession of steps for the quad-phase SLM. Note that for the quad-phase PRE algorithm that the fully complex range becomes $\gamma=\sqrt{1/2}$, as indicated by the dashed curve in FIG. 6f. Also note that FIG. 6f distinguishes between two regions in the encoding range of the PRE algorithm. For each region a tri-phase PRE algorithm is used. If $a_{ci}$ is in region I then it is encoded using the modulation values $a_{m1}=1$, $a_{m2}=j$, $a_{m3}=-1$ and if $a_{c1}$ is in region II then it is encoded using $$a_{m1}=1, a_{m4}=-j, a_{m3}=-1.$$

$$a_i=1 \text{ if } 0 \leq s_i < p_i$$

$$a_i=\pm j \text{ if } p_i \leq s_i < 1-r_i$$

$$a_i=-1 \text{ if } 1-r_i \leq s_i \leq 1$$

The encoding formula can be written where in the second line of the expression j is used if $a_{ci}$ is in region I and $-j$ is used if $a_{ci}$ is in region II. The values of probability used in eq. (7) are determined by solving the equation $$\begin{bmatrix} \text{re}(a_{ci}) \\ \text{im}(a_{ci}) \\ 1 \end{bmatrix} = \begin{bmatrix} 1 & 0 & -1 \\ 0 & \pm 1 & 0 \\ 1 & 1 & 1 \end{bmatrix} \begin{bmatrix} p_i \\ q_i \\ r_i \end{bmatrix}$$

where +1 is used if $a_{ci}$ is in region I and −1 is used if $a_{ci}$ is in region II.

F. Encoding Algorithms for Quantized Bi-amplitude Phase SLMs

FIG. 7 identifies the various encoding regions for PRE and MDE with the addition of the modulation value $a_{m0}=0$. For both tri-phase MDE (FIG. 7a) and quad-phase MDE (FIG. 7c) one additional decision region is formed. For PRE onto the tri-phase SLM, there are three regions, each which is pseudorandom encoded using the modulation values $a_{m0}=0$ and two of the other three values $a_{m1}$, $a_{m2}$, $a_{m3}$ in FIG. 7b. Similarly for PRE with a quad-phase SLM there are four regions, each which is pseudorandom encoded using eqs. (5) and (6) with $a_{m0}$ and two of the other four values $a_{m1}$, $a_{m2}$, $a_{m3}$, $a_{m4}$ in FIG. 7d.

Even though different PRE algorithms are used for the quantized bi-amplitude SIMs than for the quantized phase-only SLMs the encoding range of the PRE algorithms are identical. This leads to the PRE and MDE regions for the blended algorithms being identical to those for the phase-only SLMs (FIG. 6c,d,g,h), with one exception (FIG. 6c). From FIG. 7c and 7d it can be seen that MDE region V is entirely contained inside the PRE encoding range and thus, this region always is encoded by PRE and it never is encoded by MDE. Therefore FIG. 6g and 6h apply to the bi-amplitude SLM as well. However, FIG. 7a,b shows that some of MDE region IV (the three shaded regions) are outside the encoding range for PRE. Therefore, the three shaded regions should be added onto FIG. 6c to properly describe the encoding regions for MD-PRE for the tri-phase bi-amplitude SLM. For mMD-PRE the mMDE regions take precedence over the MDE IV regions and thus FIG. 6d describes the encoding range for both the phase-only and the bi-amplitude SLM.

In passing we note for MD-PRE on tri-phase bi-amplitude SLMs that there is a dramatic difference between encoding a value in the PRE region and the MDE IV regions that are outside the PRE region. Desired values in the PRE region are mapped on a percentage basis to one of the three closest SLM values while values in the MDE IV region are always mapped to zero. This algorithm has led to the somewhat paradoxical result that some values further from zero are mapped to zero more frequently than other values that are closer to zero.

G. Specification of the Desired Function to be Encoded

The desired function that is encoded is written in the form $$a_c(x, y) = \sum_{k=1}^{7} \exp(j\theta_k)\exp(j2\pi kx) \sum_{l=1}^{7} \exp(j\theta_l)\exp(j2\pi ly)$$

where $\theta_k$ are the phases specified by Krackhardt et al. for a maximum diffraction efficiency, phase-only 1×7 spot array. Eq. (9), which is periodic, is sampled to produce a 32×32 unit cell of complex values and from this a 4×4 array of cells are adjoined to produce the array of 128×128 desired complex values.

Neither PRE nor blended encoding require that the desired function be designed by optimization. Nor were optimized functions encoded in the literature. However, it is useful to use eq. (9) because this function and its performance are well known, and because it provides information that relates the performance of encoding procedures to the performance of optimized designs.

Since eq. (9) is periodic one also might wonder whether or not periodic functions have a performance advantage over non-periodic functions. Hassebrook et al. is the only study of blended algorithms that uses a non-periodic function. However several of our studies on PRE alone including Cohn and Duelli (Jan 1999) have identified that SBWP of the desired function, diffraction efficiency of the desired function and the mean squared distance between the desired function values and the modulation values critically control performance. Work by Cohn and coworkers since 1994 which include simulated and experimental demonstrations using both non-periodic functions and periodic functions, all demonstrate similar dependence on these parameters that define the properties of the function.

The encoding of the optimized function suggests that in addition to design, that the encoding algorithms could also be used to remap an optimized design from one type of modulation characteristic into another. A specific application of remapping would be to use the encoding algorithms for quantized modulation to quantize a continuous phase-only DOE design.

H. Simulation Procedures and Definition of the Performance Metrics

The far-field diffracted intensity patterns are simulated by fast Fourier transforming the encoded values $a_i$ and then squaring the magnitude for each of the pseudorandom and the nonrandom encodings. For all metrics except diffraction efficiency the 128×128 array is placed in a 512×512 array of zeroes that is fast Fourier transformed. For diffraction efficiency the 128×128 array is fast Fourier transformed directly. Diffraction efficiency η is simply the sum of the intensities of the 49 spots divided by the sum of all intensities in the 128×128 diffraction pattern. For bi-amplitude modulation characteristics, the energy absorption in the modulator plane also needs to be accounted for. Therefore, the ratio of desired energy to total energy in the diffraction pattern is multiplied by the ratio of unity transmittance pixels to the total number of SLM pixels. Nonuniformity of the peaks (NU) is calculated as the standard deviation of the peak intensities of the 49 spots divided by the average spot intensity. Signal-to-peak-noise ratio (SPR) is the ratio of the average peak intensity of the spots to the maximum noise peak of the 512×512 pattern excluding the square region that contains the 7×7 spot array. The signal to noise ratio (SNR) is the ratio of the average intensity of the peak values of each of the 49 spots divided by the average intensity outside the square region containing the 7×7 spot array. SNR is reported for completeness and to provide continuity with the results and theory on the performance of ternary PRE that was presented in the literature. However, in a later section we provide little discussion of the SNR results because SNR does not well characterize the noise in MDE and MD-PRE which, rather than being white, is localized to a small number of large noise spikes. The calculation of the various metrics from experimental measurements is described in the final section.

In addition to describing the specific encoding algorithms that are to be evaluated in this study, we hope that our development of these algorithms may serve as examples and suggest how blended encoding algorithms can be developed for the myriad of possible modulation characteristics.

Simulation Results

This section compares the performance of PRE, MDE, MDE-PRE and mMDE-PRE algorithms for various modulation characteristics in terms of SPR, NU and η as a function of the blending/scaling parameter γ and also at selected optimal values of γ*.

For each encoding performed in this study the identical desired function $a_{ci}$ and the 128×128 array of uniform random numbers $s_i$ are used. Using the same random numbers is important because each new set of random numbers used in encoding can affect the value of the performance metrics. However, even using an identical array of random numbers still causes there to be fluctuations in the performance curves. These fluctuations can be reduced by performing the same encoding algorithm multiple times with several sets of random numbers, and then averaging together the performance metrics. However, the trends in the performance curves are adequately evident for the purpose of comparing the performance advantages of one algorithm to another.

The detailed performance results for the various SLM types are reported below. The first set of results are for continuous SLMs. While there is no distinction between MD-PRE and mMDE-PRE for these characteristics, the results for continuous SLMs provide the clearest demonstration of the improvements due to blending and they also provide a baseline against which to compare the performance when the phase characteristic is coarsely quantized.

A. Results for Continuous SLMs

FIG. 8 shows the performance as a function of γ for the encoding of the identical function on phase-only and bi-amplitude phase SLMs. MD-PRE for both SLM types is presented together with MDE for the bi-amplitude SLM (which for γ=∞ is equivalent to MDE for the phase-only SLM.) For each SPR and NU curve there is a particular value of 1<γ<<∞ for which the performance metric is optimal. The performance metrics for each algorithm when SPR is maximum is reported in tabular form in Table 1. Since NU is fairly flat in the vicinity of peak SPR, this additional data is not presented. Comparing the curves and table entries against each other it can also be seen that MD-PRE for bi-amplitude SLMs outperforms MD-PRE for phase-only SLMs. Both algorithms outperform MDE in SPR and NU. Clearly MDE produces greater diffraction efficiency; however, the diffraction efficiency for the MD-PRE algorithms can exceed 80% (near γ=1.6) and still outperform the best MDE in terms of SPR and NU. The trends in these performance curves are similar to that observed in the literature where a non-optimized, lower diffraction efficiency function was encoded.

B. Results for Quantized Phase-only SLMs

The characteristics of the various algorithms and their influence on performance can be appreciated by considering the simulated diffraction patterns of FIG. 9. The values of γ* used for each type of encoding is reported in Table 2 together with the tabulated performance metrics. The grayscale in FIG. 9 has been set to bring out the structure of the background noise. The background for PRE is a relatively bright speckle pattern (FIG. 9a) while the background for MDE is a much different pattern of noise spikes at harmonically related spatial frequencies (FIG. 9d). The background for MD-PRE (FIG. 9c) also contains noise spikes having a similar spatial distribution of noise as for MDE, but which are not as bright as for MDE. There also is a speckle pattern that is quite faint. The background for mMD-PRE (FIG. 9b) contains a speckle background that is slightly brighter than the speckle pattern for MD-PRE but which is much less bright than the patterned noise spikes for MD-PRE. There are even patterned noise spikes in FIG. 9b, but they are faint and obscured to a large degree by the speckle pattern. FIG. 9 has been used to show how blending trades off between the background noise properties of PRE and MDE. The cross sections in FIG. 10 of the intensity patterns allow a more quantitative comparison of the performance of the four encoding algorithms. FIG. 10 makes clear that it is the appearance of a few very large noise spikes that leads to the low values of SPR for MDE and MD-PRE. FIG. 10 also provides a visual comparison of uniformity of the spot arrays. While the mMD-PRE is the most uniform of the four cross sections, the differences are best appreciated by considering the values of NU reported in Table 2 for the uniformity of all 49 spots. The same visual and qualitative distinctions for the four diffraction patterns can be made for encoding with the more finely quantized modulation characteristics (FIG. 3e,c,f) considered in this study. Since noise spikes and the nonuniformity are generally lower these differences are harder to see and they provide no additional insight on the properties of the encoding algorithms. For this reason the algorithms are compared in terms of their performance metrics in the remainder of this invention.

The performance of the blended encoding algorithms as a function of γ are given in FIG. 11. While the curves are noisier than for the continuous curves in FIG. 8, it can be seen that for each SPR curve the maximum value is found for a specific value of γ* corresponding to a specific blending of PRE and MDE (or mMDE). We have never found a case in which either pure PRE or pure MDE produced better performance than the blended results. Similarly, for each NU curve, the minimum value corresponds to a specific value of blending parameter γ*. Of most significance to this study is that the mMD-PRE curves always attain larger values of SPR and lower values of NU than the corresponding MD-PRE curves. This is true despite the fact that MD-PRE has the larger diffraction efficiency. Rather than reporting the best SPR and the best NU, Table 2 reports the performance for the best overall combination of SPR and NU (as based on empirical judgement rather than cost function.) The selection of the best value of γ* is not especially critical because NU (or SPR) is slowly varying near its local minimum (or maximum.)

C. Results for Quantized Bi-amplitude Phase SLMs

FIG. 12 and Table 3 report these results. Similar trends to those noted for the quantized phase-only SLMs are observed for the bi-amplitude SLMs. Once again each curve demonstrates that there is a particular degree of blending that produces the best fidelity as measured by SPR or NU. Also the largest value of SPR for mMD-PRE is always greater than the largest value of SPR value for MD-PRE. Similarly, the smallest value of NU for mMD-PRE is always smaller than the smallest value of NU for MD-PRE. The diffraction efficiency for the tri-phase encodings shows that the MD-PRE actually has lower diffraction efficiency than mMD-PRE for γ≦1. This reflects the fact that many of the values in the MDE region IV (specifically, the shaded regions of FIG. 7a) are being mapped to zero.

Comparing the quantized bi-amplitude results with the quantized phase-only results shows that the extra zero-valued state markedly improves the fidelity measures. The diffraction efficiency curves in FIGS. 11 and 12 are essentially identical as a function of γ except for the tri-phase MD-PRE curve (which differs because region IV in FIG. 7a extends outside the PRE region.) Also, the diffraction efficiency performance reported in Tables 2 and 3 depends directly on the value of γ* required to optimize the fidelity metrics. Therefore, the diffraction efficiency of blended algorithms on phase-only SLMs turns out sometimes to be higher and sometimes to be lower than the efficiency of blended algorithms on bi-amplitude SLMs.

Experimental Results
A. SLM Characterization and Experimental Procedures

A BNS 128×128 pixel reflective SLM is used in our experiments. BNS normally sells this SLM with ferroelectric liquid crystal. On request they will fill the cell with parallel aligned nematic liquid crystal (LC) as was done for us and other groups as well. The relation between voltage and phase modulation has been determined by two different methods. One is an interferometric method based on Young's fringes. The second uses the diffraction pattern of a random bi-phase distribution.

For a perfect device the two methods should lead to the same phase characteristic; however, variations in phase response are known to occur across the device. We find experimentally that using the results from the random bi-phase method for phases up to $\pi$ and from the interferometric method for the ranges $\pi$ to $2\pi$ give the best correspondence between the actual and an ideal phase-only SLM. For a frequency doubled Nd-YVO$_4$ laser (532 nm) we found that a $2\pi$ range is produced with 80 electrically-addressable grayscale levels. However, due to the nonlinear transfer curve that is typical for LC SLM's, the phase levels are not equally spaced.

For the measurement of the spot arrays the linearly polarized laser beam is spatially filtered and collimated. The reflective SLM is uniformly illuminated with linearly polarized light oriented with the extraordinary axis of the LC. The light reflected from the SLM is collected by a Fourier transform lens and the resulting Fraunhofer diffraction pattern (specifically the zero diffraction order of the SLM grating) is recorded with a Cohu 4915 CCD camera and attached National Instruments black and white frame grabber.

After subtracting off any fixed background noise, the performance metrics are calculated as described in section H with the following exceptions: A noticeable spot, due to reflections from the cover glass of the SLM, is always present on the optical axis. It is omitted from all the calculations. The average background noise level is used not only in calculating SNR but also for diffraction efficiency $\pi$. The average noise level is determined by adding the intensity in several regions (which excludes the undesired on-axis spot and which covers about 40% of the total area in the zero-order) and then dividing by the area of these regions. The average of the maximum intensity of each of the desired spots is also calculated and the ratio of the two averages gives SNR. The peak noise spike is found in the identical region that is used for the average noise level calculation. This value of peak noise is used in the calculation of SPR. For diffraction efficiency calculations the average noise level is multiplied by the total area of the zero-order region to estimate the noise energy. This together with the energy in the desired spots is considered to be the total energy for purposes of comparing the diffraction efficiency of the experiment to theory.

While calculating efficiency in the above way does provide good agreement between experiment and theory, it is not representative of the physically true efficiency of the BNS SLM. What we find using a power meter to measure incident and reflected light from the SLM (with all pixels set to grayscale level 0) is that 1.7% of the energy appears in the on-axis spot, ~5.7% of the energy appears in all diffraction orders (as measured by re-imaging the SLM onto the detector of the power meter) and a surprisingly low 0.9% of the energy appears in the zero-order diffraction pattern.

These measurements are aided by a slight lack of parallelism between some of the surfaces in the SLM which causes the unmodulated spot from the cover glass of the SLM to become spatially resolved from the modulated spot at large distances from the SLM. When a linear phase ramp is programmed on the SLM we observe that the modulated spot is translated with 95% of its energy present in the translated position and essentially no energy present in the original position. In the higher orders there is also a translated spot but the unmodulated spot is undetectable. This leads to the conclusion that the unmodulated spot is from a continuous surface that has no spatially-varying modulation. That is to say there is no additional contribution to the unmodulated spot from the dead zones between the pixels. This is further supported by images of the SLM in the phase-only configuration that show dark lines between the pixels. However in the amplitude modulating configuration, when viewed through crossed polarizers, the dead zones are bright, which shows that they rotate the polarization.

Also, the losses cannot be attributed entirely to pixel fill factor. BNS quotes the pixel fill factor of a typical device as 60% and we measured a 54% fill factor when viewing images of the SLM under incoherent illumination. Fill factors in this range indicate that between 29% to 36% of the modulated reflection should appear in the zero order. Therefore, we conclude that there are losses of more than an order of magnitude in the LC cell.

B. Performance of the Encodings

The phase-only designs summarized in Tables 1 and 2 are implemented with the phase-only SLM and the measured performance is reported in parentheses in the tables. The measured diffraction efficiencies and SNR usually are quite close, though somewhat less than the simulated values. There are larger deviations between the simulated and measured SPR and NU, with measured SPR usually being smaller and measured NU usually being larger than the simulated values. The measured values still demonstrate the advantages of the modified to the conventional blended algorithm, even though these differences are more difficult to see. In terms of SPR for the tri-phase SLM the measured differences for the two types of blending are much less than predicted. The differences are much more pronounced for the quad-phase SLM. The situation is reversed for NU. There appears to be a floor to NU of 14% and so for the quad-phase SLM, which is predicted to produce more uniform patterns, NU is only slightly different between the MD-PRE and mMD-PRE algorithms. However, NU is much larger for PRE and MDE and this increase in NU is clearly seen in the measurements.

Since the experimental and simulated measurements of performance differ, it could be the case that the optimal performance occurs for different values of $\gamma$. This is explored for the case of mMD-PRE onto a quad-phase phase-only SLM (FIG. 13). The performance measurements are compared against the simulated results (originally plotted in FIG. 11). FIG. 13 shows that the measured diffraction efficiency is somewhat lower than simulated, the measured NU is higher than simulated and the measured SPR is usually lower than simulated. The shape of each measured curve is quite similar which suggests that for our experimental SLM that the simulated value of $\gamma^*$ will be reasonably close to the optimal value of $\gamma$ for experimental settings. While much closer agreement between measurement and theory has been demonstrated with fixed pattern diffractive optics, we believe that these results are in quite close agreement for programmable SLMs which suffer from inaccuracies in setting the SLM phase identically on each pixel. Also, interference effects due to multiple reflections from the SLM layers and other optical surfaces in the optical system can influence the measurements, especially in the case of NU measurements.

One other possible source of discrepancy between theory and experiment for the NU measurements is the nonuniformity introduced by the frequency rolloff due to the subapertures of the SLM pixels. Since the desired portion of the diffraction pattern is along a diagonal the intensity rolloff is proportional to $sinc^4(x)$. We find the closest correspondence between the simulated and experimentally measured NU occurs if a square pixel aperture of 56% fill factor is used to simulate the pixel induced rolloff of the originally simulated diffraction pattern. For the particular design considered here the intensity at the spot location furthest from the optical axis (i.e. the 7,7 position) is reduced by 16% from the intensity at the spot that is closest to the optical axis. We find that recalculating NU with the additional rolloff would have increased NU by only 0.5% to 1.5% over the results reported in Tables 1 and 2 for phase-only and quantized phase-only SLMs. Similarly recalculated values of NU are plotted in FIG. 13 (dashed line.)*(Footnote) While the theory and experiment are brought into closer agreement, the other factors considered above appear still to be the dominant sources of error.

Footnote: The influence due to rolloff may at first seem to be surprisingly small, but calculating the effect of this rolloff on the non-uniformity/standard deviation of the ideally uniform spot array gives NU=4.2%. Furthermore, since the simulated values of NU generally are greater than 4%, and that standard deviations rather than being additive, add as the square root of the sum of the squares, helps explain the small influence of the rolloff on NU.

Summary of Results

We have described and compared two possible ways of combining minimum distance encoding (MDE) with pseudorandom encoding (PRE). The new modified approach maps the desired value to the closest value that can be achieved by pseudorandom encoding. Simulations with four types of coarsely quantized SLM characteristics clearly show that the modified blended algorithm mMD-PRE outperforms the conventional MD-PRE algorithm in fidelity as measured by peak levels of background noise across the full SBWP of the SLM and by the uniformity of the desired spot array.

Blending by either approach leads to significant improvements in performance over that originally reported in prior literature for PRE and MDE used individually. Especially significant is the 2× to 3× increase in diffraction efficiency over PRE alone as a result of blending. It even is possible to increase diffraction efficiency over the values reported for best fidelity (i.e. the result for $\gamma^*$) by trading off uniformity and SPR as controlled by the scaling parameter $\gamma$.

The experimentally implemented designs always showed that the modified blending outperformed the conventional blending, though the differences are not always as evident in all cases studied. This is attributed in large part to errors in controlling the phase of each SLM pixel identically. However, the measured diffraction patterns match the simulated diffraction patterns much more closely than was previously possible using an optically addressed SLM as has been reported previously. The earlier SLM produced undesired noise orders due to its nonlinear properties and increased nonuniformity of the spot arrays due to its limited resolution. With these limitations absent, the spot arrays are more uniform and the background noise-orders are primarily associated with the encoding algorithms and SLM quantization. A further desirable improvement in SLMs would be reduction of the on-axis spot that is due to reflections from the cover and interfaces of the SLM, and which is accentuated by the low efficiency reflectance of modulated light. Even though further improvements in SLMs are desirable, these experimental results do demonstrate that the encoding algorithms proposed here perform in a manner quite similar to the simulations, thus making the algorithms suitable for use in real-time systems.

Implications for Future Research

While blended algorithms tend to improve the optical performance of SLM-based systems over the unblended PRE algorithms, there is additional overhead. Specifically, a search is required to find the optimal scaling parameter $\gamma^*$. At this time the only known way to perform this search numerically involves repeated fast Fourier transform (FFT) based simulations. Additional studies on encoding various functions could possibly lead to the development of a knowledge base that would provide a good a priori estimate of the optimal value $\gamma^*$. Alternatively it may be possible to develop theoretical models of the performance of the encoding algorithms as a function of $\gamma$. A third possibility would be the inclusion in the optical system of an image sensor that records the far-field pattern and evaluates the performance on-line. This would permit much faster evaluation and, as FIG. 13 illustrates, the in situ measurements could be used to compensate for the non-ideal behavior and other vagaries of current SLMs.

In this invention we briefly considered trading off fidelity to increase the diffraction efficiency. We achieved this by increasing the value of the blending parameter to increase the amount of MDE in the mMD-PRE algorithm. Additional tradeoffs that favor diffraction efficiency can be envisioned by blending the conventional and modified MD-PRE algorithms. The proposed blending could be geometrically interpreted (see FIG. 1) as a mapping from the desired value $a_c$ to a point on the exterior of the PRE (shaded) region. The mapping can be considered to be a linear combination of the modified and conventional minimum distance mappings. The actual implementation could be performed in at least two ways: (1) The value/point that $a_c$ is mapped to is pseudorandom encoded. (2) The modified and conventional encodings are randomly selected so that the value that $a_c$ is mapped to is realized on average. Further analysis is required to determine if these approaches actually provide a second tradeoff parameter in addition to $\gamma$ or if one or both of these are alternate interpretations of mMD-PRE. Certainly such studies may prove valuable since FIGS. 11 and 12 show that for the same value of · the diffraction efficiency for MD-PRE is as much as 0.15 greater than the efficiency for mMD-PRE; especially when diffraction efficiency has a much higher premium than fidelity.

In conclusion, the performance of Fourier transform holograms from coarsely quantized SLMs can be significantly improved over minimum distance, pseudorandom and conventional blended encoding by instead using algorithms that blend pseudorandom encoding with modified minimum distance encoding. While the new blended algorithm does not outperform blended algorithms for continuous phase SLMs, it may well be adequate to use coarse quantized SLMs in place of continuous SLMs in a number of applications. These algorithms may be especially useful for SLM developers because they permit early testing and evaluation with prototype devices that have greatly simplified and much less costly electrical addressing circuitry.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A process of designing Fourier transform holograms and to synthesize the phase and amplitudes of a far field diffraction pattern of an optical wave, A first selecting step for selecting desired far field pattern of the optical wave; performing a Fourier transform using the fast Fourier transforms or identities from a table of Fourier transform pairs on the desired far field pattern of the optical wave to get a desired source distribution description that determines desired complex valued pixel amplitudes $a_{ci}$ for each pixel i; and A second selecting step for selecting pixel modulation, setting $a_I$ for each pixel i from the limited values available to a pixel by a combination of pseudorandom encoding for values of $a_{ci}$ within the PRE encoding range of the with pixel, and by modified minimum distance encoding selection method for values of $a_{ci}$ outside the PRE encoding range for the with pixel, wherein said second selecting step uses a blend of modified minimum distance encoding and pseudorandom encoding in laser pattern generation in which the pixel modulation values are quantized in three or more complex values.

2. A process as defined in claim 1 wherein said second selecting step uses a blend of modified minimum distance encoding and pseudorandom encoding in laser pattern generation and digital printing (or multilevel halftoning) in which the pixel modulation values are quantized in real values which are greater than two.

3. A process of designing Fourier transform holograms and to synthesize the phase and amplitudes of a far field diffraction pattern of an optical wave, A first selecting step for selecting desired far field pattern of the optical wave; performing a Fourier transform using the fast Fourier transforms or identities from a table of Fourier transform pairs on the desired far field pattern of the optical wave to get a desired source distribution description that determines desired complex valued pixel amplitudes $a_{ci}$ for each pixel i; and A second selecting step for selecting pixel modulation, setting $a_I$ for each pixel i from the limited values available to a pixel by a combination of pseudorandom encoding for values of $a_{ci}$ within the PRE encoding range of the with pixel, and by modified minimum distance encoding selection method for values of $a_{ci}$ outside the PRE encoding range for the with pixel, wherein said second selecting step uses a blend of modified minimum distance encoding and pseudorandom encoding in laser pattern generation in which the pixel modulation values are selected from a continuous range of complex values including phase-only, bi-amplitude phase and amplitude-phase coupled.

4. A process as defined in claim 3 wherein said second selecting step uses a blend of modified minimum distance encoding and pseudorandom encoding in laser pattern generation in which the pixel modulation values are selected from a modulation range composed of both continuous ranges and quantized values.

* * * * *